US009683517B2

(12) United States Patent
Kim et al.

(10) Patent No.: US 9,683,517 B2
(45) Date of Patent: Jun. 20, 2017

(54) APPARATUS AND METHOD FOR SUPPLYING FUEL TO ENGINE OF SHIP

(71) Applicant: DAEWOO SHIPBUILDING & MARINE ENGINEERING CO., LTD., Seoul (KR)

(72) Inventors: Nak Hyun Kim, Seongnam-si (KR); Dong Chan Kim, Busan (KR); Cheong Gi Park, Seoul (KR); Je Heon Jung, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 358 days.

(21) Appl. No.: 14/521,855

(22) Filed: Oct. 23, 2014

(65) Prior Publication Data

US 2015/0121859 A1    May 7, 2015

(30) Foreign Application Priority Data

Nov. 7, 2013   (KR) .......................... 10-2013-0134587
Jan. 15, 2014   (KR) .......................... 10-2014-0005117

(51) Int. Cl.
*F02M 21/02*   (2006.01)
*B63H 21/38*   (2006.01)

(52) U.S. Cl.
CPC .... *F02M 21/0245* (2013.01); *F02M 21/0215* (2013.01); *B63H 21/38* (2013.01); *Y02T 10/32* (2013.01)

(58) Field of Classification Search
CPC ...................................... B63H 21/18

USPC .................................. 440/88 F; 60/419, 450
See application file for complete search history.

(56) References Cited

U.S. PATENT DOCUMENTS

| | | | | |
|---|---|---|---|---|
| 4,285,195 A | * | 8/1981 | Budzich | F15B 11/055 137/596 |
| 5,884,488 A | * | 3/1999 | Gram | F04B 15/08 417/901 |
| 6,220,052 B1 | * | 4/2001 | Tate, Jr. | F25J 1/0208 62/51.2 |
| 6,865,980 B2 | * | 3/2005 | Jonninen | F03C 1/0431 60/456 |

(Continued)

FOREIGN PATENT DOCUMENTS

JP   2012-177333 A   9/2012
KR   10-2003-0038393 A   5/2003

(Continued)

OTHER PUBLICATIONS

Korean Office Action dated Jun. 21, 2016 of corresponding Korean Patent Application No. 10-2014-0005117—5 pages.

(Continued)

*Primary Examiner* — Thomas E Lazo
(74) *Attorney, Agent, or Firm* — Knobbe Martens Olson & Bear LLP

(57) ABSTRACT

Disclosed herein are an apparatus and a method for supplying a fuel to an engine of a ship. The apparatus for supplying a fuel to an engine of a ship includes: a high pressure pump pressurizing a liquefied natural gas (LNG) and supplying the pressurized LNG to the engine; a hydraulic motor driving the high pressure pump; and a lubricating pump supplying lubricating oil to the high pressure pump.

16 Claims, 8 Drawing Sheets

(56) References Cited

U.S. PATENT DOCUMENTS

| | | | |
|---|---|---|---|
| 7,497,180 B2 * | 3/2009 | Karlsson | B63J 99/00 114/74 R |
| 7,955,149 B2 * | 6/2011 | Levander | B63B 25/12 440/88 F |
| 8,043,136 B2 * | 10/2011 | Sipila | B63J 2/00 440/88 F |
| 8,281,820 B2 * | 10/2012 | White | F17C 5/02 141/37 |
| 8,591,273 B2 * | 11/2013 | Nylund | B63B 25/12 114/74 A |
| 9,151,248 B2 | 10/2015 | Lee et al. | |
| 2011/0057049 A1 * | 3/2011 | Hofbauer | F02M 53/02 239/5 |
| 2013/0269633 A1 * | 10/2013 | Bui | B63H 21/12 123/3 |
| 2013/0312408 A1 * | 11/2013 | Murata | F02M 21/0215 60/605.1 |
| 2015/0184617 A1 | 7/2015 | Kim et al. | |
| 2015/0192093 A1 | 7/2015 | Lee et al. | |
| 2016/0052612 A1 | 2/2016 | Lee et al. | |

FOREIGN PATENT DOCUMENTS

| | | | |
|---|---|---|---|
| KR | 10-2008-0042928 A | | 5/2008 |
| KR | 10-2009-0117553 A | | 11/2009 |
| KR | 10-2011-0128080 A | | 11/2011 |
| KR | 20-2012-0003585 U | | 5/2012 |
| KR | 10-2012-0114265 A | | 10/2012 |
| KR | 10-2012-0126755 A | | 11/2012 |
| KR | 10-2013-0054345 A | | 5/2013 |
| KR | 10-1277833 B1 | | 6/2013 |

OTHER PUBLICATIONS

First Action Interview Pre-Interview Communication dated Jul. 8, 2015 of related U.S. Appl. No. 14/659,499—7 pages.

International Search Report dated Jan. 8, 2015 of PCT Application No. PCT/KR2014/008660 which is the parent application of related U.S Appl. No. 14/659,484—3 pages.

Office Action dated Oct. 15, 2014 of corresponding Korean Patent Application No. 10-2013-0134587—4 pages.

* cited by examiner

APPARATUS AND METHOD FOR SUPPLYING FUEL TO ENGINE OF SHIP

CROSS-REFERENCE TO RELATED APPLICATIONS

This application claims priority from and the benefit of Korean Patent Application Nos. 10-2013-0134587 filed Nov. 7, 2013 and 10-2014-0005117 filed Jan. 15, 2014, which are hereby incorporated by reference in their entirety for all purposes as if fully set forth herein.

BACKGROUND

Field

The present disclosure relates to a ship using a liquefied natural gas (LNG) as a fuel, and more particularly, to an apparatus and a method for supplying a fuel to an engine of a is ship and an apparatus and a method for regulating a speed of a high pressure pump supplying LNG to an engine.

Discussion of the Background

Recently, in the case of burning heavy oil, marine diesel oil (MDO), or the like, that has been used as a fuel of various engines in ships in the related art, seriousness of environmental contamination due to various harmful materials included in an exhaust gas has increased, such that regulation for various engines of a ship using oil such as heavy oil, or the like, as a fuel has been intensified and a cost for satisfying this regulation has gradually increased.

Therefore, a ship that does not use the oil such as the heavy oil, the MDO, or the like, as the fuel or uses a minimum amount of heavy oil or MOD as the fuel and uses a clean fuel such as a liquefied natural gas (LNG), a liquefied petroleum gas (LPG), a compressed natural gas (CNG), di-methyl ether (DME), or the like, which are gas fuels, has been suggested as a solution, and many technologies of this ship have been developed.

Since the LNG is a combustible gas, a zone in which there is the possibility that the combustible gas will be introduced in the marine structure carrying or using the LNG has been designated as a danger zone, and an explosion-proof device has been used in the danger zone so that explosion or a fire does not occur at the time of introduction of the combustible gas that may occur in some cases.

SUMMARY

An aspect of the present invention is to provide an apparatus for supplying a fuel to an engine of a ship capable of miniaturizing and lightening all devices for supplying a fuel to an engine and being installed in an explosion-proof zone without an additional device to supply power and lubricating oil to a high pressure pump, and a method for supplying a fuel to an engine of a ship using the same.

Another aspect of the present invention is to provide an apparatus for regulating a speed of a high pressure pump capable of miniaturizing and lightening all devices supplying a fuel to an engine and being installed in an explosion-proof zone without an additional device, and a method for regulating a speed of a high pressure pump using the same.

According to an exemplary embodiment of the present invention, there is provide an apparatus for supplying a fuel to an engine of a ship, including: a high pressure pump pressurizing a liquefied natural gas (LNG) and supplying the pressurized LNG to the engine; a hydraulic motor driving the high pressure pump; and a lubricating pump supplying lubricating oil to the high pressure pump.

The apparatus for supplying a fuel to an engine of a is ship may further include first and second hydraulic power units supplying oil to the hydraulic motor, wherein the second hydraulic power unit is operated in the case in which the first hydraulic power unit is not operable.

The first hydraulic power unit may be connected to the hydraulic motor by a first hydraulic line on which a first shutdown valve is installed, the second hydraulic power unit may be connected to the hydraulic motor by a second hydraulic line on which a second shutdown valve is installed, and the first shutdown valve may be opened in the case in which the first hydraulic power unit is operated and the second shutdown valve may be opened in the case in which the second hydraulic power unit is operated.

The apparatus for supplying a fuel to an engine of a ship may further include a pressure gauge installed in the first hydraulic line and measuring a pressure of the first hydraulic line.

The apparatus for supplying a fuel to an engine of a ship may further include a lubricating motor driving the lubricating pump.

The apparatus for supplying a fuel to an engine of a ship may further include third and fourth hydraulic power units supplying oil to the lubricating motor, wherein the fourth hydraulic power unit is operated in the case in which the third hydraulic power unit is not operable.

The third hydraulic power unit may be connected to the lubricating motor by a third hydraulic line on which a third shutdown valve is installed, the fourth hydraulic power unit may be connected to the lubricating motor by a fourth hydraulic line on which a fourth shutdown valve is installed, and the third shutdown valve may be opened in the case in which the third hydraulic power unit is operated and the fourth shutdown valve may be opened in the case in which the fourth hydraulic power unit is operated.

The apparatus for supplying a fuel to an engine of a ship may further include a hydraulic power unit supplying oil to the hydraulic motor and the lubricating motor.

The hydraulic power unit may be connected to the lubricating motor by a hydraulic line on which a pressure regulating valve is installed, and the pressure regulating valve may be a valve regulating an amount of oil supplied to the lubricating motor.

According to another exemplary embodiment of the present invention, there is provided an apparatus for supplying a fuel to an engine of a ship, including: a high pressure pump pressurizing an LNG and supplying the pressurized LNG to the engine; a hydraulic motor driving the high pressure pump; a first hydraulic power unit supplying oil to the hydraulic motor; and a second hydraulic power unit supplying oil to the hydraulic motor in the case in which the first hydraulic power unit is not operable.

The first hydraulic power unit may be connected to the hydraulic motor by a first hydraulic line on which a first shutdown valve is installed, the second hydraulic power unit may be connected to the hydraulic motor by a second hydraulic line on which a second shutdown valve is installed, and the first shutdown valve may be opened in the case in which the first hydraulic power unit is operated and the second shutdown valve may be opened in the case in which the second hydraulic power unit is operated.

The apparatus for supplying a fuel to an engine of a ship may further include a pressure gauge installed in the first hydraulic line and measuring a pressure of the first hydraulic line.

According to still another exemplary embodiment of the present invention, there is provided an apparatus for regulating a speed of a high pressure pump of a ship, including: a hydraulic motor driving the high pressure pump while regulating the speed of the high pressure pump; a hydraulic power unit including a fixed displacement type hydraulic pump and a reservoir storing oil therein and regulating an amount of oil supplied to the hydraulic motor to regulate the speed of the hydraulic motor; and a recirculation valve allowing a portion of the oil transferred from the reservoir by the fixed displacement type hydraulic pump to again flow to the reservoir.

The recirculation valve may be installed inside the hydraulic power unit.

The recirculation valve may be installed outside the hydraulic power unit.

The high pressure pump may pressurize an LNG and supply the pressurized LNG to an engine.

According to yet still another exemplary embodiment of the present invention, there is provided a method for regulating a speed of a high pressure pump of a ship, including: transferring oil stored in a reservoir toward a hydraulic line connected to a hydraulic motor using a fixed displacement type hydraulic pump; regulating a recirculation valve installed on a hydraulic line branched from the hydraulic line to regulate an amount of oil supplied to the hydraulic motor, thereby regulating a speed of the hydraulic motor; and allowing the speed of the high pressure pump to be regulated depending on the regulation of the speed of the hydraulic motor.

The fixed displacement type hydraulic pump and the reservoir may be included in a hydraulic power unit, and the recirculation valve may be installed inside the hydraulic power unit.

The fixed displacement type hydraulic pump and the reservoir may be included in a hydraulic power unit, and the recirculation valve may be installed outside the hydraulic power unit.

The high pressure pump may pressurize an LNG and supply the pressurized LNG to an engine.

DETAILED DESCRIPTION OF EMBODIMENTS

Figure 1:
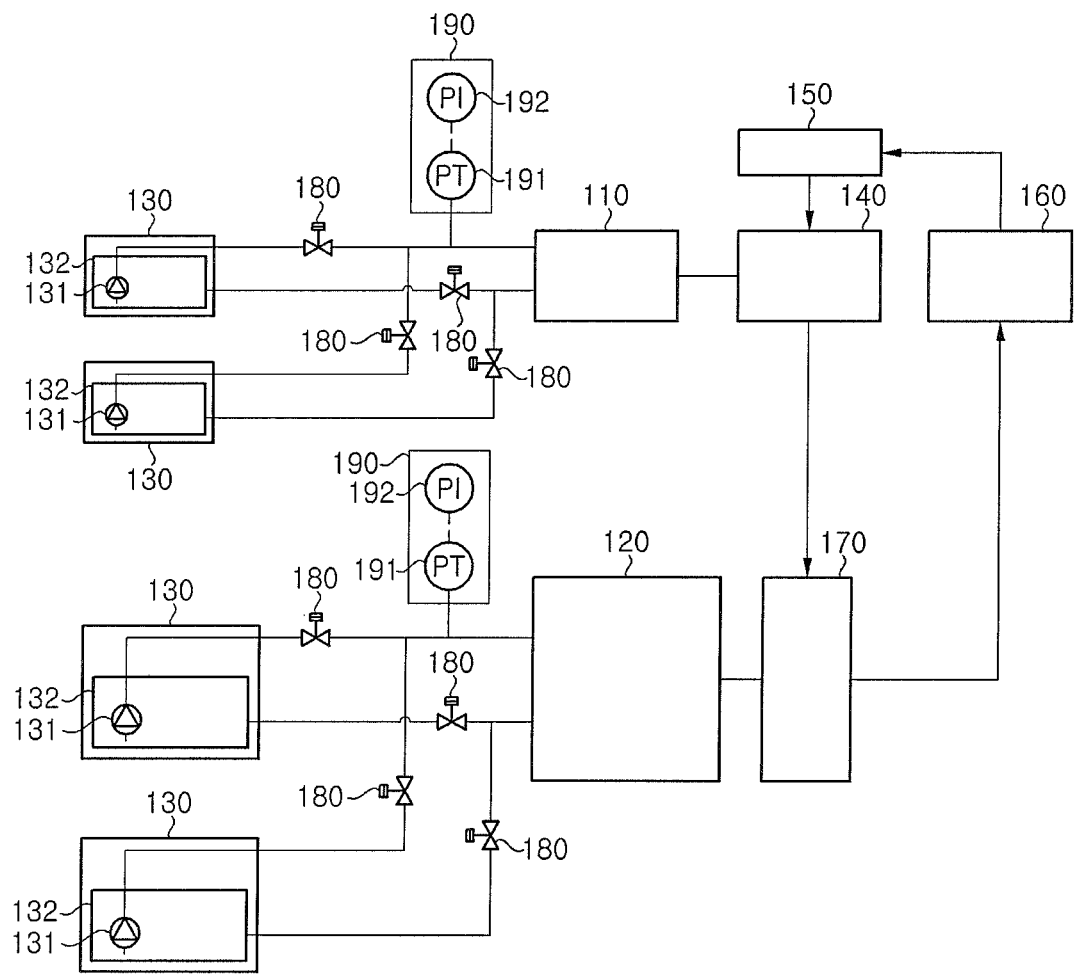
FIG. 1 is a view showing an example of an apparatus for supplying a fuel to an engine of a ship according to an exemplary embodiment of the present invention.

Hereinafter, exemplary embodiments of the present invention will be described in detail with reference to the accompanying drawings. First, it is to be noted that in giving reference numerals to components of each of the accompanying drawings, the same components will be denoted by the same reference numerals even though they are illustrated in different drawings. Further, in describing exemplary embodiments of the present invention, well-known functions or constructions will not be described in detail since they may unnecessarily obscure the understanding of the present invention.

In the case of a main engine (MEGI) using the LNG as a fuel, a supply condition of high pressure (200 to 300 barg) has been demanded, and a high pressure pump and a high pressure vaporizer have been used in order to satisfy this condition.

In order to drive the high pressure pump, an electric motor or a hydraulic motor may be used. However, the United State Coast Guard (USCG) has defined a zone in which the high pressure pump is present as an explosion-proof zone to prohibit the electric motor from being used in this zone, and has defined so as to install a partition wall between the high pressure pump and the electric motor in order to use the electric motor. Therefore, in the case of using the electric motor, the partition wall should be separately installed. In addition, lubricating oil should be supplied to the high pressure pump in order to smoothly drive a driving part for a long period of time.

Meanwhile, in the case of the main engine, a fuel supply system that may be driven by the LNG at a low speed as well as at a high speed has been recently demanded, which means that a load of the engine may be significantly variably driven.

In terms of the fuel supply system, the system should be configured so as to variably satisfy a fuel supply amount by the load of the main engine. In order to supply the fuel so as to be in accord with an amount of fuel required by the engine, a speed of the high pressure pump should be regulated. The motor is installed in order to drive the high pressure pump. According to the related art, the electric motor and a variable frequency drive (VFD) are installed, and the VFD regulates a frequency supplied to the electric motor to regulate a speed of the electric motor.

However, the USCG has defined a zone in which the high pressure pump is present as an explosion-proof zone to prohibit the electric motor from being used in this zone, and has defined so as to install a partition wall between the high pressure pump and the electric motor in order to use the electric motor. Therefore, in the case of using the electric motor, the partition wall should be separately installed.

Generally, a nitrogen oxide (NOx) and a sulfur oxide (SOx) among waste gases drained from a ship have been regulated by the International Maritime Organization. Recently, discharge of a carbon dioxide has also been regulated. Particularly, the regulation for the nitrogen oxide (NOx) and the sulfur oxide (SOx) was imposed through a protocol of the prevention of marine pollution from ships (MARPOL) in 1997, and an effectuation requirement for the regulation for the nitrogen oxide (NOx) and to the sulfur oxide (SOx) was satisfied in May, 2005, which is a time after a long time of eight years elapses, such that the regulation for the nitrogen oxide (NOx) and the sulfur oxide (SOx) has been currently effected as a compulsory rule.

Therefore, various methods for decreasing a drain amount of nitrogen oxide (NOx) have been introduced in order to satisfy the above-mentioned rule. Among them, a high pressure natural gas injection engine for a marine structure including a ship, or the like, such as a liquefied natural gas (LNG) carrier, for example, an MEGI engine has been developed and used. The MEGI engine has been prominent as the environment-friendly next generation engine that may decrease a drain amount of carbon dioxide, which is a pollutant, by 23% or more, a drain amount of nitrogen compound, which is a pollutant, by 80% or more, and a drain amount of sulfur compound, which is a pollutant, by 95% or more, as compared with a diesel engine having the same level of output.

The MEGI engine as described above may be installed in the ship such as the LNG carrier storing LNG in a storage tank enduring a very low temperature and carrying the LNG or the marine structure such as various plants, or the like. In this case, a natural gas is used as a fuel of an engine, and a high fuel gas supply pressure of about 200 to 400 tiara (absolute pressure) is required in the engine depending on a load of the engine.

The MEGI engine may be used in a state in which it is directly connected to a propeller for propulsion. To this end, the MEGI engine is configured of a two-stroke engine rotated at a low speed. That is, the MEGI engine is a low speed two-stroke high pressure natural gas injection engine.

Since a zone in which a high pressure pump is present is an explosion-proof zone, it is dangerous to operate the high pressure pump using an electric motor. In addition, lubricating oil should be supplied to the high pressure pump in order to smoothly drive a driving part of the high pressure pump for a long period of time. Therefore, in an exemplary embodiment of the present invention, the high pressure pump is driven using a hydraulic motor, and the lubricating oil is supplied to the high pressure pump using a lubricating motor and a lubricating pump.

Figure 2:
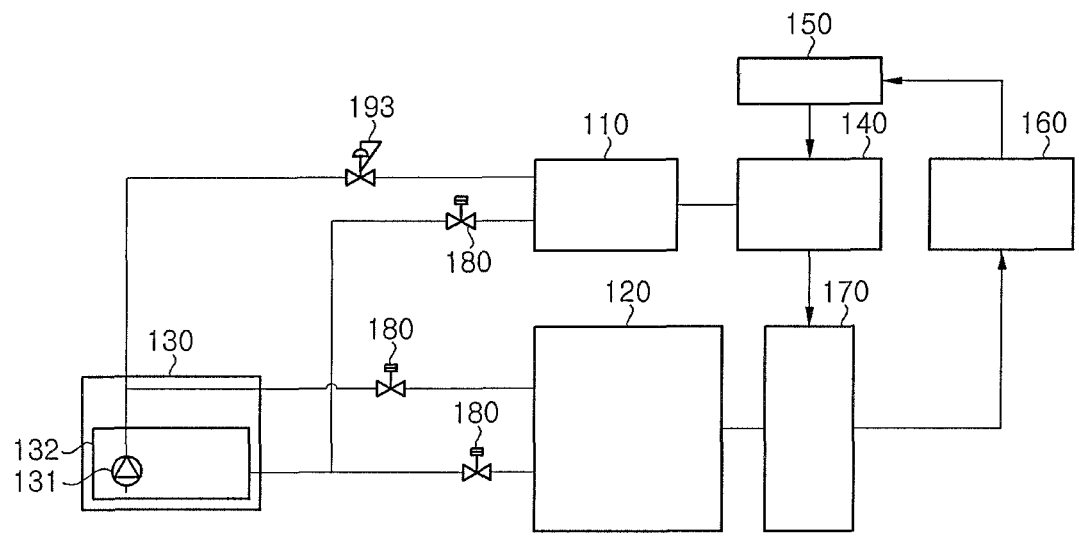
FIG. 2 is a view showing another example of an apparatus for supplying a fuel to an engine of a ship according to an exemplary embodiment of the present invention.

FIG. 1 is a view showing an example of an apparatus for supplying a fuel to an engine of a ship according to an exemplary embodiment of the present invention; and FIG. 2 is a view showing another example of an apparatus for supplying a fuel to an engine of a ship according to an exemplary embodiment of the present invention.

As shown in FIGS. 1 and 2, the apparatus for supplying a fuel to an engine of a ship according to an exemplary embodiment of the present invention is configured to include a high pressure pump 170 pressurizing a liquefied natural gas (LNG) and supplying the pressurized LNG to the engine, hydraulic motor 120 driving the high pressure pump 170, a lubricating pump 140 supplying lubricating oil to the high pressure pump 170, and a lubricating motor 110 driving the lubricating pump 140.

The hydraulic motor 120 is connected to the high pressure pump 170 to drive the high pressure pump 170. A driving shaft is connected between the hydraulic motor 120 and the high pressure pump 170, and driving force of the hydraulic motor 120 may be transferred to the high pressure pump 170 through the driving shaft.

Since a zone in which the high pressure pump 170 is present is a danger zone in which the possibility of explosion is present, a device using electricity, which may cause a spark, may not be installed in the danger zone in order to secure safety. Therefore, in an exemplary embodiment of the present invention, the hydraulic motor 120 rather than an electric motor is used as a driving apparatus of the high pressure pump 170, which is advantageous in terms of maintenance and space utilization without installing the electric motor in the danger zone.

A hydraulic power unit 130 is a device supplying oil to the hydraulic motor 120 in order to drive the hydraulic motor 120.

The hydraulic power unit 130 includes a hydraulic pump 131 and a reservoir 132. The reservoir 132 is a storage tank storing the oil therein. As shown in FIGS. 1 and 2, the hydraulic motor 120 and the reservoir 132 are connected to each other by a hydraulic line, and the hydraulic pump 131 is installed on the hydraulic line through which the oil flows from the reservoir 132 to the hydraulic motor 120. The hydraulic pump 131 supplies the oil stored in the reservoir 132 to the hydraulic motor 120, and the oil drives the hydraulic motor 120 and then flows again into the reservoir 132 through the hydraulic line.

The lubricating pump 140 supplies the lubricating oil to the high pressure pump 170. The lubricating pump 140 supplies the lubricating oil stored in a lubricating oil reservoir 150 to the high pressure pump 170, and since a temperature of the lubricating oil drained from the high pressure pump 170 rises, the lubricating oil drained from the high pressure pump 170 is cooled using a cold coolant in a cooler 160 and then enters again the lubricating oil reservoir 150.

The lubricating pump 140 is driven by the lubricating motor 110. A driving shaft connected between the lubricating motor 110 and the lubricating pump 140, and driving force of the lubricating motor 110 may be transferred to the lubricating pump 140 through the driving shaft.

The lubricating motor 110 is driven by the oil supplied thereto by the hydraulic power unit 130.

As shown in FIGS. 1 and 2, the lubricating motor 110 and the reservoir 132 of the hydraulic power unit 130 are connected to each other by a hydraulic line, and the hydraulic pump 131 is installed on the hydraulic line through which the oil flows from the reservoir 132 to the lubricating motor 110. The hydraulic pump 131 supplies the oil stored in the reservoir 132 to the lubricating motor 110, and the oil drives the lubricating motor 110 and then flows again into the reservoir 132 through the hydraulic line.

As shown in FIG. 1, each of the lubricating motor 110 and the hydraulic motor 120 may be connected to two hydraulic power units 130.

That is, since the hydraulic motor 120 is connected to the two hydraulic power units 130, in the case in which one of the two hydraulic power units 130 may not be operated due to a fault, or the like, the other of the two hydraulic power units 130 is operated to supply the oil to the hydraulic motor 120, such that the hydraulic motor 120 may be continuously operated normally.

In addition, since the lubricating motor 110 is also connected to the two hydraulic power units 130, in the case in which one of the two hydraulic power units 130 may not be operated due to a fault, or the like, the other of the two hydraulic power units 130 is operated to supply the oil to the lubricating motor 110, such that the lubricating motor 110 may be continuously operated normally.

As shown in FIG. 1, a shutdown valve 180 is installed on each of the hydraulic line connecting the hydraulic motor 120 and the hydraulic power unit 130 to each other and the hydraulic line connecting the lubricating motor 110 and the hydraulic power unit 130 to each other. When the hydraulic power unit 130 connected to the hydraulic line on which the corresponding shutdown valve 180 is installed is operated, the corresponding shutdown valve 180 is opened, and when the hydraulic power unit 130 connected to the hydraulic line on which the corresponding shutdown valve 180 is installed is not operated, the corresponding shutdown valve 180 is closed.

That is, in the case in which a first hydraulic power unit 130 and a second hydraulic power unit 130 are connected to the hydraulic motor 120, the shutdown valve 180 installed on the hydraulic line connected to the first hydraulic power unit 130 is opened during a period in which the first hydraulic power unit 130 is operated, and the shutdown valve 180 installed on the hydraulic line connected to the first hydraulic power unit 130 is closed and the shutdown valve 180 installed on the hydraulic line connected to the second hydraulic power unit 130 is opened when a fault occurs in the first hydraulic power unit 130, such that the second hydraulic power unit 130 is operated.

In addition, a pressure gauge 190 is installed on the hydraulic line to sense whether or not a fault has occurred in the hydraulic power unit 130. The pressure gauge 190 includes a pressure transmitter 191 and a pressure indicator 192. The pressure transmitter 191 measures a pressure of the hydraulic line and transmits the measured pressure to the pressure indicator 192, and the pressure indicator 192 indicates the received pressure. When the pressure indicated by the pressure gauge 190 exceeds a normal range, it is judged that a fault has occurred in the hydraulic power unit 130 that is in operation, the shutdown valve 180 installed on the hydraulic line connected to the hydraulic power unit 130 that is in operation is closed, and the shutdown valve 180 installed on the hydraulic line connected to the other hydraulic power unit 130 is opened, thereby making it possible to operate the other hydraulic power unit 130.

As shown in FIG. 2, the lubricating motor 110 and the hydraulic motor 120 may be connected to one hydraulic power unit 130. When the lubricating motor 110 and the hydraulic motor 120 receive the oil from one hydraulic power unit 130 as shown in FIG. 2, the number of installed hydraulic power units 130 is decreased, such that an additional device may be decreased, thereby making it possible to simplify a system configuration.

Here, since the lubricating motor 110 requires a smaller amount of oil than an amount of oil required by the hydraulic motor 120, a pressure regulating valve (PRV) 193 is installed on the hydraulic line connected to the lubricating motor 110 to regulate an amount of oil supplied to the lubricating motor.

Figure 3:
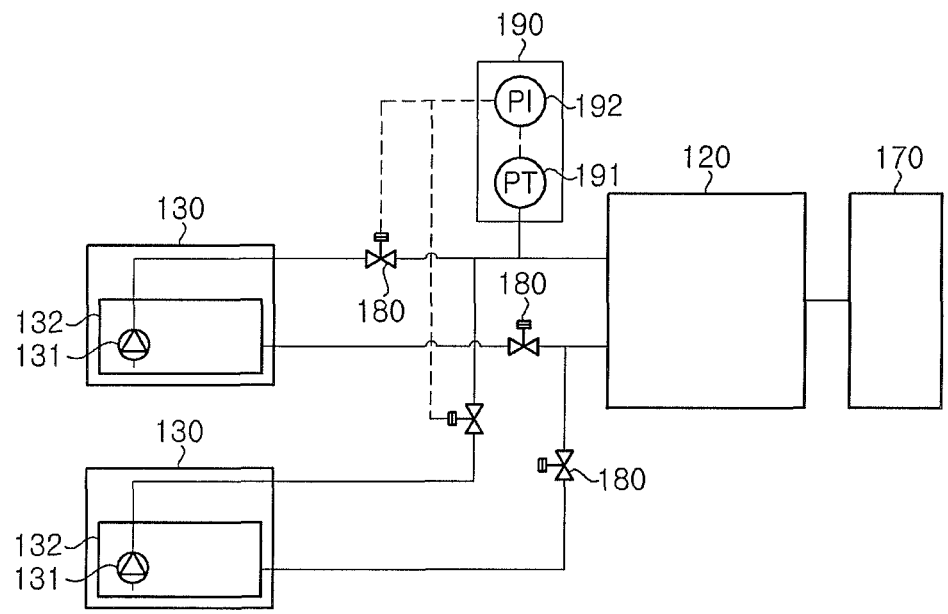
FIG. 3 is a view showing still another example of an apparatus for supplying a fuel to an engine of a ship according to an exemplary embodiment of the present invention.

FIG. 3 is a view showing still another example of an apparatus for supplying a fuel to an engine of a ship according to an exemplary embodiment of the present invention.

As shown in FIG. 3, the apparatus for supplying a fuel to an engine of a ship according to an exemplary embodiment of the present invention is configured to include a high pressure pump 170 pressurizing an LNG and supplying the pressurized LNG to the engine, a hydraulic motor 120 driving the high pressure pump 170, and two hydraulic power units 130 supplying oil to the hydraulic motor 120.

The hydraulic motor 120 is connected to the high pressure pump 170 to drive the high pressure pump 170. A driving shaft is connected between the hydraulic motor 120 and the high pressure pump 170, and driving force of the hydraulic motor 120 may be transferred to the high pressure pump 170 through the driving shaft.

A hydraulic power unit 130 is a device supplying oil to the hydraulic motor 120 in order to drive the hydraulic motor 120.

The hydraulic power unit 130 includes a hydraulic pump 131 and a reservoir 132. The reservoir 132 is a storage tank storing the oil therein. As shown in FIG. 3, the hydraulic motor 120 and the reservoir 132 are connected to each other by a hydraulic line, and the hydraulic pump 131 is installed on the hydraulic line through which the oil flows from the reservoir 132 to the hydraulic motor 120. The hydraulic pump 131 supplies the oil stored in the reservoir 132 to the hydraulic motor 120, and the oil drives the hydraulic motor 120 and then flows again into the reservoir 132 through the hydraulic line.

As shown in FIG. 3, the hydraulic motor 120 may be connected to two hydraulic power units 130.

That is, since the hydraulic motor 120 is connected to the two hydraulic power units 130, in the case in which one of the two hydraulic power units 130 may not be operated due to a fault, or the like, the other of the two hydraulic power units 130 is operated to supply the oil to the hydraulic motor 120, such that the hydraulic motor 120 may be continuously operated normally.

As shown in FIG. 3, a shutdown valve 180 is installed on the hydraulic line connecting the hydraulic motor 120 and the hydraulic power unit 130 to each other. When the hydraulic power unit 130 connected to the hydraulic line on which the corresponding shutdown valve 180 is installed is operated, the corresponding shutdown valve 180 is opened, and when the hydraulic power unit 130 connected to the hydraulic line on which the corresponding shutdown valve 180 is installed is not operated, the corresponding shutdown valve 180 is closed.

That is, in the case in which a first hydraulic power unit 130 and a second hydraulic power unit 130 are connected to the hydraulic motor 120, the shutdown valve 180 installed on the hydraulic line connected to the first hydraulic power unit 130 is opened during a period in which the first hydraulic power unit 130 is operated, and the shutdown valve 180 installed on the hydraulic line connected to the first hydraulic power unit 130 is closed and the shutdown valve 180 installed on the hydraulic line connected to the second hydraulic power unit 130 is opened when a fault occurs in the first hydraulic power unit 130, such that the second hydraulic power unit 130 is operated.

In addition, a pressure gauge 190 is installed on the hydraulic line to sense whether or not a fault has occurred in the hydraulic power unit 130. When the pressure indicated by the pressure gauge 190 exceeds a normal range, it is judged that a fault has occurred in the hydraulic power unit 130 that is in operation, the shutdown valve 180 installed on the hydraulic line connected to the hydraulic power unit 130 that is in operation is closed, and the shutdown valve 180 installed on the hydraulic line connected to the other hydraulic power unit 130 is opened, thereby making it possible to operate the other hydraulic power unit 130.

Since a load of the MEGI engine is variable, a speed of the high pressure pump supplying the fuel to the engine should be regulated, and since a zone in which the high pressure pump is present is an explosion-proof zone, it is dangerous to operate the high pressure pump using an electric motor. Therefore, in an exemplary embodiment of the present invention, a method for regulating a speed of a high pressure pump using a hydraulic motor is provided.

Figure 4:
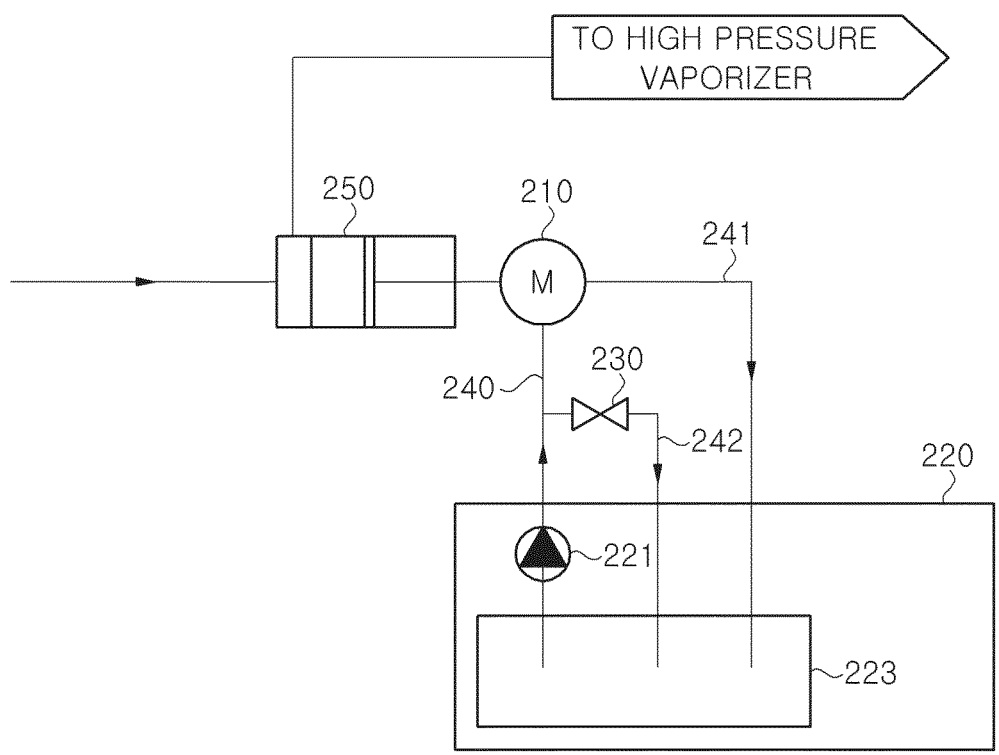
FIG. 4 is a view showing an example of an apparatus for regulating a speed of a high pressure pump of a ship according to an exemplary embodiment of the present invention.
Figure 5:
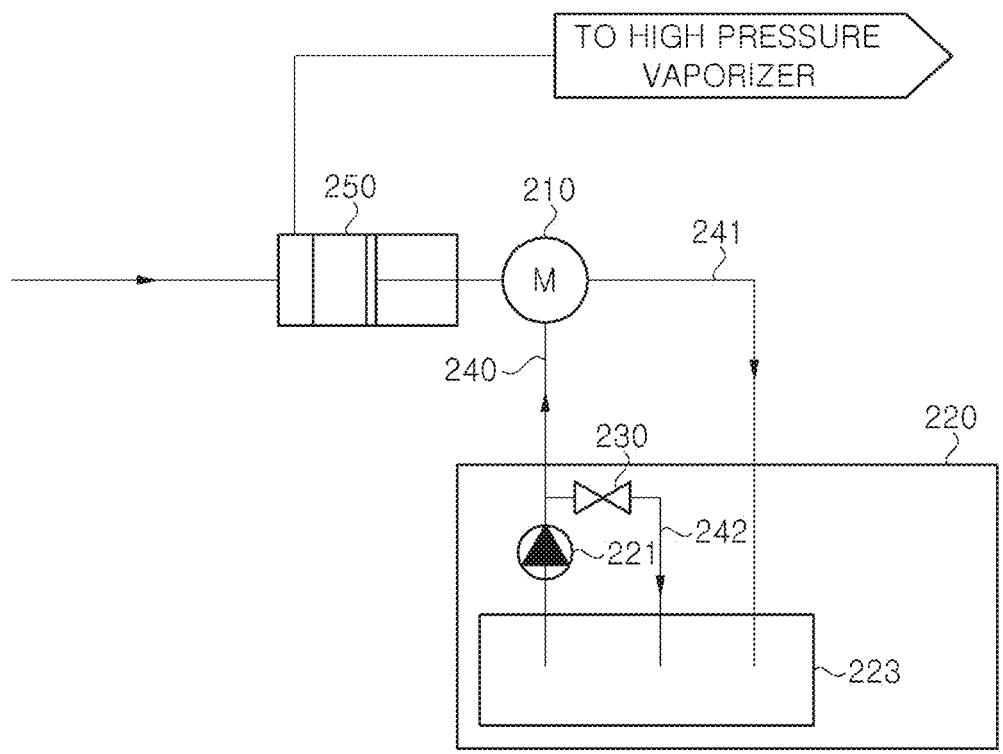
FIG. 5 is a view showing another example of an apparatus for regulating a speed of a high pressure pump of a ship according to an exemplary embodiment of the present invention.

FIG. 4 is a view showing an example of an apparatus for regulating a speed of a high pressure pump of a ship according to an exemplary embodiment of the present invention; FIG. 5 is a view showing another example of an apparatus for regulating a speed of a high pressure pump of a ship according to an exemplary embodiment of the present invention; and FIG. 6 is a view showing still another example of an apparatus for regulating a speed of a high pressure pump of a ship according to an exemplary embodiment of the present invention.

Figure 6:
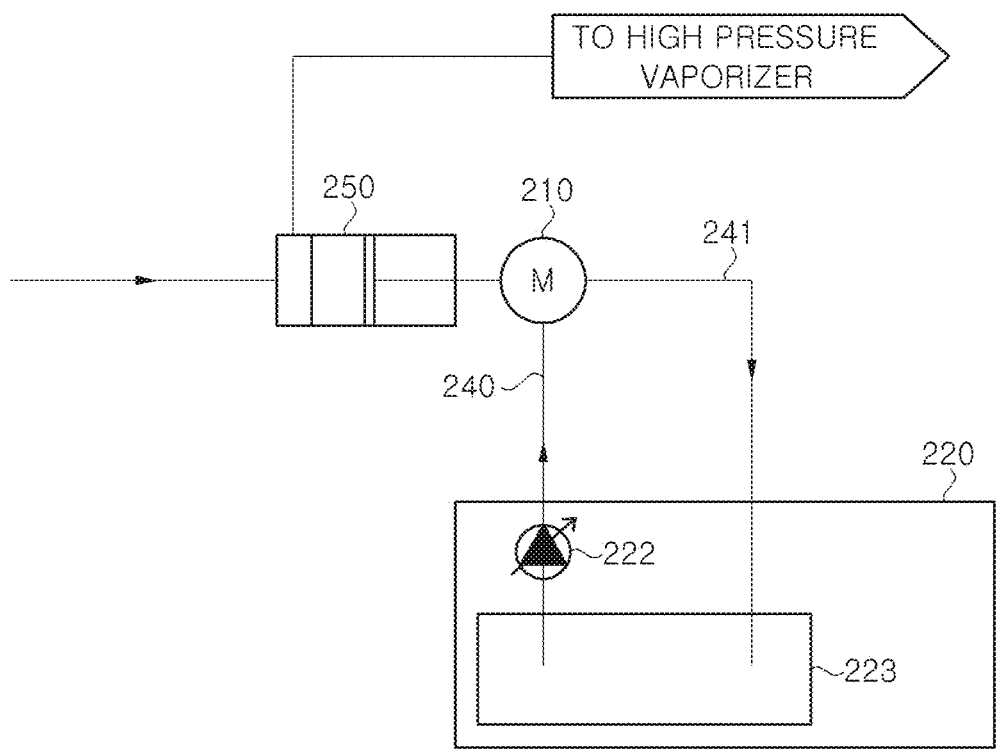
FIG. 6 is a view showing still another example of an apparatus for regulating a speed of a high pressure pump of a ship according to an exemplary embodiment of the present invention.

As shown in FIGS. 4 to 6, the apparatus for regulating a speed of a high pressure pump of a ship according to an exemplary embodiment of the present invention is configured to include a hydraulic motor 210 and a hydraulic power unit 220.

The hydraulic motor 210 is connected to the high pressure pump 250 to drive the high pressure pump 250 while regulating a speed of the high pressure pump 250. A driving shaft is connected between the hydraulic motor 210 and the high pressure pump 250, and driving force of the hydraulic motor 210 may be transferred to the high pressure pump 250 through the driving shaft.

The high pressure pump 250 supplies LNG to the engine through a high pressure vaporizer. However, since an amount of LNG required by the engine is variable, the speed of the high pressure pump 250 should be able to be regulated. Therefore, in an exemplary embodiment of the present invention, a speed of the hydraulic motor 210 is regulated to regulate the speed of the high pressure pump 250.

Since a zone in which the high pressure pump 250 is present is a danger zone in which the possibility of explosion is present, a device using electricity, which may cause a spark, may not be installed in the danger zone in order to secure safety. Therefore, in an exemplary embodiment of the present invention, the hydraulic motor 210 rather than an electric motor is used as a driving apparatus of the high pressure pump 250, which is advantageous in terms of maintenance and space utilization without installing the electric motor in the danger zone.

The hydraulic power unit 220, which is a device supplying the oil to the hydraulic motor 210 in order to drive the hydraulic motor 210, regulates an amount of oil supplied to the hydraulic motor 210 to regulate the speed of the hydraulic motor 210.

The hydraulic power unit 220 includes a hydraulic pump 221 or 222 and a reservoir 223. The reservoir 223 is a storage tank storing the oil therein. As shown in FIGS. 4 to 6, the hydraulic motor 210 and the reservoir 223 are connected to each other by hydraulic lines 240 and 241, and the hydraulic pump 221 or 222 is installed on the hydraulic line 240 through which the oil flows from the reservoir 223 to the hydraulic motor 210. The hydraulic pump 221 or 222 supplies the oil stored in the reservoir 223 to the hydraulic motor 210, and the oil drives the hydraulic motor 210 and then flows again into the reservoir 223 through the hydraulic line 241.

Here, in order to regulate the speed of the hydraulic motor 210, an amount of oil supplied to the hydraulic motor 210 should be regulated.

In FIGS. 4 and 5, a fixed displacement type hydraulic pump 221 is installed in the hydraulic power unit 220, and a hydraulic line 242 branched from the hydraulic line 240 through which the oil flows from the reservoir 223 to the hydraulic motor 210 and again connected to the reservoir and a recirculation valve 230 are installed. That is, the fixed displacement type hydraulic pump 221 continuously pumps constant amount of oil, and the recirculation valve 230 is regulated to regulate an amount of oil supplied to the hydraulic motor 210. For example, when a speed of the hydraulic motor 210 is to be increased, the recirculation valve is closed to allow a large amount of oil to be supplied to the hydraulic motor 210, when a speed of the hydraulic motor 210 is to be decreased, the recirculation valve is opened to allow a large amount of oil to flow to the hydraulic line 242, thereby allowing a small amount of oil to be supplied to the hydraulic motor 210. Here, an opened degree of the valve is regulated, thereby making it possible to regulate an amount of oil supplied to the hydraulic motor 210.

FIG. 4 is a view showing the case in which the recirculation valve is installed outside the hydraulic power unit 220, and FIG. 5 is a view showing the case in which the recirculation valve is installed inside the hydraulic power unit 220.

In the case in which a worker uses the hydraulic power unit 220 that includes the fixed displacement type hydraulic pump 221 but does not have the recirculation valve installed therein, he/she separately installs the recirculation valve 230 outside the hydraulic power unit 220 as shown in FIG. 4, thereby making it possible to regulate an amount of oil supplied to the hydraulic motor 210.

Alternatively, the worker may use the hydraulic power unit 220 that includes the fixed displacement type hydraulic pump 221 and has the recirculation valve 230 installed therein, as shown in FIG. 5.

FIG. 6 shows the case in which the hydraulic power unit 220 includes a variable displacement type hydraulic pump 222. In FIG. 6, the variable displacement type hydraulic pump 222 is regulated to regulate an amount of oil pumped from the reservoir 223 by the variable displacement type hydraulic pump 222, thereby making it possible to regulate an amount of oil supplied to the hydraulic motor 210.

Figure 7:
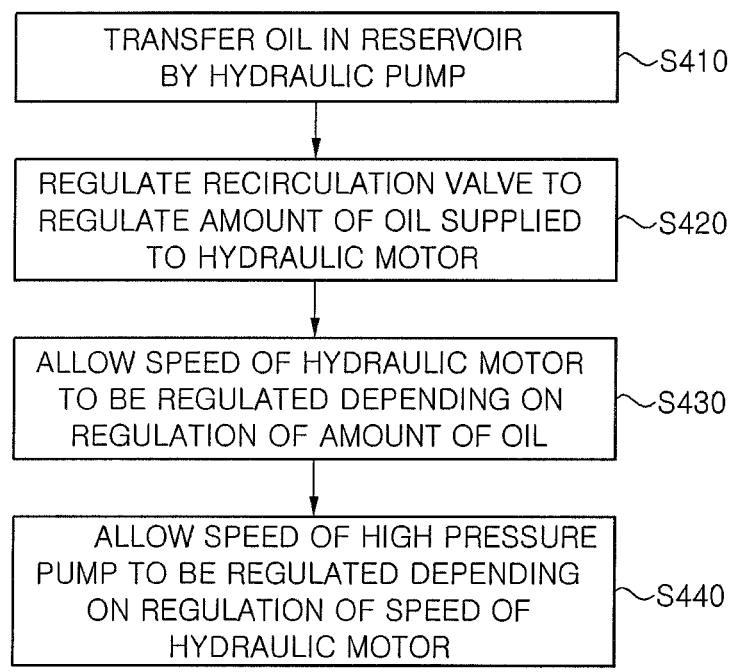
FIG. 7 is a flow chart showing an example of a method is for regulating a speed of a high pressure pump of a ship according to an exemplary embodiment of the present invention.
Figure 8:
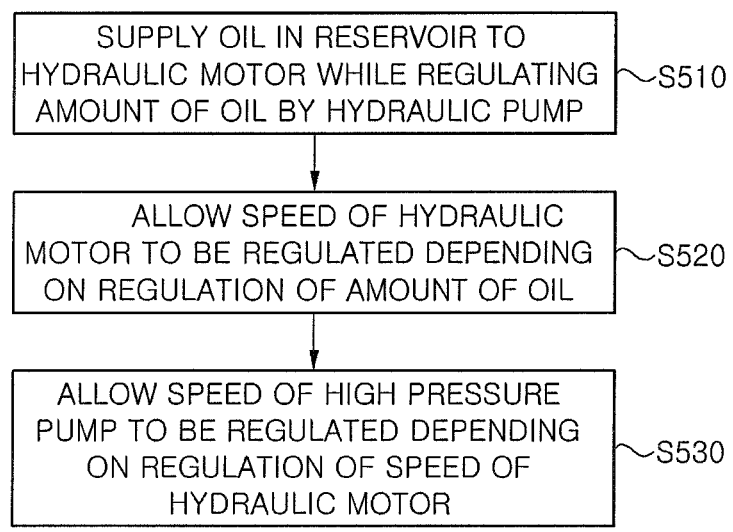
FIG. 8 is a flow chart showing another example of a method for regulating a speed of a high pressure pump of a ship according to an exemplary embodiment of the present invention.

Next, a method for regulating a speed of a high pressure pump of a ship according to an exemplary embodiment of the present invention will be described with reference to FIGS. 7 and 8. FIG. 7 is a flow chart showing an example of a method for regulating a speed of a high pressure pump of a ship according to an exemplary embodiment of the present invention; and FIG. 8 is a flow chart showing another example of a method for regulating a speed of a high pressure pump of a ship according to an exemplary embodiment of the present invention.

FIG. 7 shows a method for regulating a high pressure pump of a ship by the apparatus for regulating a speed of a high pressure pump of a ship shown in FIGS. 4 and 5.

As shown in FIG. 7, the oil in the reservoir 223 of the hydraulic power unit 220 is transferred toward the hydraulic line 240 by the hydraulic pump 221 (S410). Here, since the hydraulic pump 221 is the fixed displacement type hydraulic pump, it continuously transfers a constant amount of oil toward the hydraulic line 240.

Then, the recirculation valve 230 is regulated to regulate an amount of oil supplied to the hydraulic motor 210 (S420). Here, the recirculation valve 230 may be installed outside the hydraulic power unit 220 as shown in FIG. 4 or be installed inside the hydraulic power unit 220 as shown in FIG. 5. That is, the fixed displacement type hydraulic pump 221 continuously transfers a constant amount of oil, and the recirculation valve 230 is regulated to regulate an amount of oil supplied to the hydraulic motor 210. For example, when a speed of the hydraulic motor 210 is to be increased, the recirculation valve is closed to allow a large amount of oil to be supplied to the hydraulic motor 210, when a speed of the hydraulic motor 210 is to be decreased, the recirculation valve is opened to allow a small amount of oil to be supplied to the hydraulic motor 210. Here, an opened degree of the valve is regulated, thereby making it possible to regulate an amount of oil supplied to the hydraulic motor 210.

Then, a speed of the hydraulic motor 210 is regulated (S430) depending on the regulation of the amount of oil, a speed of the high pressure pump 250 is regulated (S440) depending on the regulation of the speed of the hydraulic motor 210.

FIG. 8 shows a method for regulating a high pressure pump of a ship by the apparatus for regulating a speed of a high pressure pump of a ship shown in FIG. 6.

As shown in FIG. 8, the oil in the reservoir is supplied to the hydraulic motor 210 while an amount of oil is regulated by the hydraulic pump 222 (S510). Here, since the hydraulic pump 222 is the variable displacement type hydraulic pump, it is regulated, thereby making it possible to regulate an amount of oil supplied to the hydraulic motor 210.

Then, a speed of the hydraulic motor 210 is regulated (S520) depending on the regulation of the amount of oil, a speed of the high pressure pump 250 is regulated (S530) depending on the regulation of the speed of the hydraulic motor 210.

Next, a combustible material transferring apparatus driven by a hydraulic motor according to an exemplary embodiment of the present invention will be described with reference to FIGS. 9 and 10. Components of the combustible material transferring apparatus shown in FIGS. 9 and 10 can be combined to an apparatus for supplying a fuel to an engine shown in FIGS. 1 to 3.

Figure 9:
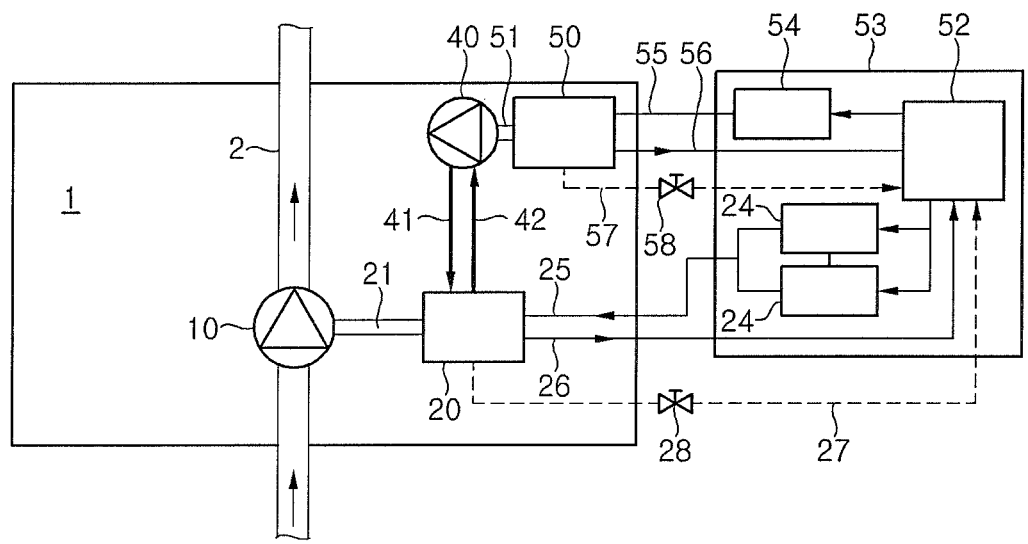
FIG. 9 is a view showing an example of a combustible material transferring apparatus driven by a hydraulic motor according to an exemplary embodiment of the present invention.

FIG. 9 is a view showing an example of a combustible material transferring apparatus driven by a hydraulic motor according to an exemplary embodiment of the present invention. The combustible material transferring apparatus according to an exemplary embodiment of the present invention shown in FIG. 9 includes a pressurizing means 10 installed in a transferring pipe 2 within a pressurizing zone 1 and pressurizing a combustible material to transfer the combustible material in one direction within the transferring pipe 2 and a hydraulic motor 20, which is a driving means installed together with the pressurizing means 10 within the pressurizing zone 1 and driving the pressurizing means 10.

As the pressurizing means 10, a pump may be used in the case of transferring a combustible material in a liquid state, such as a LNG, and a compressor may be used in the case of transferring a combustible material in a gas state such as a natural gas (BOG).

Since the pressurizing zone 1, which is a pump room or a compressor room, is a zone in which the possibility of explosion is present due to leakage of the combustible material, a device using electricity, which may cause a spark, may not be installed in the pressurizing zone in order to secure safety. Since the hydraulic motor 20 does not use the electricity, it may be installed in the pressurizing zone 1.

As described above, the hydraulic motor is used instead of the electric motor as a driving means for driving the pressurizing means 10 such as the pump, the compressor, or the like, installed in the pressurizing zone 1, thereby making it possible to provide a combustible material transferring apparatus and method advantageous in terms of maintenance and space utilization without installing the electric motor in the pressurizing zone 1 in which the possibility of explosion is present due to the leakage of the combustible material.

A driving shaft 21 is connected between the hydraulic motor 20 and the pressurizing means 10, and driving force of the hydraulic motor 20 may be transferred to the pressurizing means 10 through the driving shaft 21.

In the combustible material transferring apparatus according to an exemplary embodiment of the present invention shown in FIG. 9, a lubricating pump 40 supplying lubricating oil to the hydraulic motor 20 installed in the pressurizing zone 1 and a lubricating oil pump hydraulic motor driving the lubricating oil pump 40 are installed together with the hydraulic motor 20 in the pressurizing zone 1.

In order to smoothly drive the hydraulic pump 20, lubrication between the respective components that are operated is required. In addition, since a temperature of the LNG, which is the combustible material, is a very low temperature of approximately −163□ at a room temperature, a temperature of the pressurizing means 10 becomes very low. Therefore, the hydraulic motor 20 installed closely to the pressurizing means and connected to the pressurizing means 10 through the driving shaft 21 may also be affected by the low temperature. In the case in which an ambient temperature is low, since viscosity of the lubricating oil is increased, there is a risk that lubrication will not be performed well, such that circulation of the lubricating oil may be required.

Since the hydraulic motor 20 according to the present exemplary embodiment is connected to the pressurizing means 10 pressurizing the combustible material through the driving shaft 21, in embodiments, a structure in which the lubricating oil is circulated may be used instead a structure in which the lubricating oil stagnates in the hydraulic motor 20. To this end, the lubricating oil pump 40 and the lubricating oil pump hydraulic motor 50 are installed at positions spaced apart from the pressurizing means 10 and the hydraulic motor 20, respectively, within the pressurizing zone 1.

Similar to that the driving shaft 21 is connected between the hydraulic motor 20 and the pressurizing means 10 so that the driving force of the hydraulic motor 20 may be transferred to the pressurizing means 10, a driving shaft 51 is connected between the lubricating oil pump hydraulic motor 50 and the lubricating oil pump 40 so that driving force of the lubricating oil pump hydraulic motor 50 may be transferred to the lubricating oil pump 40.

In order to lubricate between the components included in the hydraulic motor 20, the lubricating oil may be supplied into the hydraulic motor 20 through a lubricating oil supplying line 41 extended from the lubricating oil pump 40 to the hydraulic motor 20 and may return to the lubricating oil pump 40 through a lubricating oil returning line 42 extended from the hydraulic motor 20 to the lubricating oil pump 40.

Meanwhile, the supply of an operating fluid to the hydraulic motor 20 and the lubricating oil pump hydraulic motor 50 may be simply performed by a hydraulic pressure generating apparatus that is already installed in a marine structure. However, according to the present exemplary embodiment, a dedicated hydraulic pressure generating apparatus 53 for the hydraulic motor 20 driving the pressurizing means 10 pressurizing the combustible material and the lubricating oil pump hydraulic motor 50 driving the lubricating oil pump 40 is installed, such that the hydraulic motor 20 and the lubricating oil pump hydraulic motor 50 may receive the operating fluid.

The dedicated hydraulic pressure generating apparatus 53 includes a first hydraulic pump 24 supplying the operating fluid to the hydraulic motor 20, a second hydraulic pump 54 supplying the operating fluid to the lubricating oil pump hydraulic motor 50, and a reservoir 52 storing the operating fluid therein.

Two hydraulic pumps having the same specification may be included as the first hydraulic pump 24 in the hydraulic pressure generating apparatus 53 in order to provide against a fault.

The operating fluid stored in the reservoir 52 may be pressurized by the first hydraulic pump 24, be supplied to the hydraulic motor 20 through a first supplying line 25 to operate the hydraulic motor 20, and then return again to the reservoir 52 through a first returning line 26. A portion or all of the operating fluid returning through the first returning line 26 may be supplied directly toward an upper portion of the first hydraulic motor 24 of the first supplying line 25 without passing through the reservoir 52, if necessary.

In addition, the operating fluid stored in the reservoir 52 may be pressurized by the second hydraulic pump 54, be supplied to the lubricating oil pump hydraulic motor 50 through a second supplying line 55 to operate the lubricating oil pump hydraulic motor 50, and then return again to the reservoir 52 through a second returning line 56. A portion or all of the operating fluid returning through the second returning line 56 may be supplied directly toward an upper portion of the second hydraulic pump 54 of the second supplying line 55 without passing through the reservoir 52, if necessary.

According to the present exemplary embodiment, a first drain line 27 used when draining all of the operating fluid in the hydraulic motor 20 for maintenance of the hydraulic motor 20 may be installed. The first drain line 27 may be extended from the hydraulic motor 20, particularly, a lower end portion of the hydraulic motor 20 to an outer portion of the reservoir 52 or the hydraulic pressure generating apparatus 53. The first drain line 27 has a valve 28 installed thereon, and the valve 28 is opened only when a drain work is performed, thereby draining the operating fluid in the hydraulic motor 20 toward, for example, the reservoir 52.

In addition, according to the present exemplary embodiment, a second drain line 57 used when draining all of the operating fluid in the lubricating oil pump hydraulic motor 50 for maintenance of the lubricating oil pump hydraulic motor 50 may be installed. The second drain line 57 may be extended from the lubricating oil pump hydraulic motor 50, particularly, a lower end portion of the lubricating oil pump hydraulic motor 50 to an outer portion of the reservoir 52 or the hydraulic pressure generating apparatus 53. The second drain line 57 has a valve 58 installed thereon, and the valve 58 is opened only when a drain work is performed, thereby draining the operating fluid in the lubricating oil pump hydraulic motor 50 toward, for example, the reservoir 52.

The hydraulic motor 20 and the lubricating oil pump hydraulic motor 50 according to the present exemplary embodiment may be a speed variable hydraulic motor of which a speed is variable. In the case of using the speed variable hydraulic motor, there is no need to use a separate deceleration apparatus. Therefore, the speed variable hydraulic motor occupies a smaller installation space and is more advantageous in terms of maintenance as compared with an electric motor requiring a deceleration apparatus such as a deceleration gear, or the like.

Figure 10:
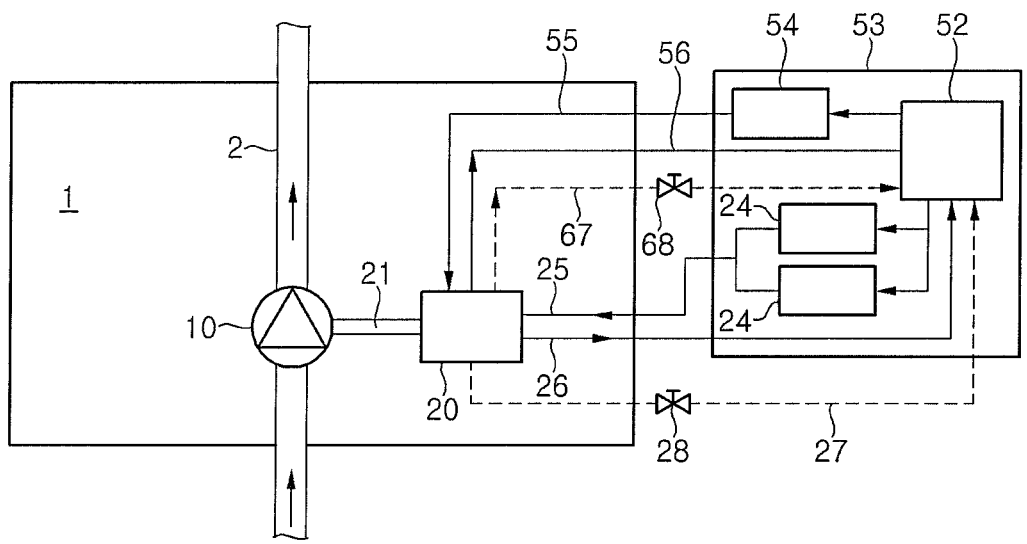
FIG. 10 is a view showing another example of a combustible material transferring apparatus driven by a hydraulic motor according an exemplary embodiment of the present invention.

FIG. 10 is a view showing another example of a combustible material transferring apparatus driven by a hydraulic motor according to an exemplary embodiment of the present invention.

The combustible material transferring apparatus according to an exemplary embodiment of the present invention shown in FIG. 10 includes a pressurizing means 10 installed in a transferring pipe 2 within a pressurizing zone 1 and pressurizing a combustible material to transfer the combustible material in one direction within the transferring pipe 2 and a hydraulic motor 20, which is a driving means installed together with the pressurizing means 10 within the pressurizing zone 1 and driving the pressurizing means 10.

As the pressurizing means 10, a pump may be used in the case of transferring a combustible material in a liquid state, such as a LNG, and a compressor may be used in the case of transferring a combustible material in a gas state such as a natural gas (BOG).

Since the pressurizing zone 1, which is a pump room or a compressor room, is a zone in which the possibility of explosion is present due to leakage of the combustible material, a device using electricity, which may cause a spark, may not be installed in the pressurizing zone in order to secure safety. Since the hydraulic motor 20 does not use the electricity, it may be installed in the pressurizing zone 1.

As described above, the hydraulic motor is used instead of the electric motor as a driving means for driving the pressurizing means 10 such as the pump, the compressor, or the like, installed in the pressurizing zone 1, thereby making it possible to provide a combustible material transferring apparatus and method advantageous in terms of maintenance and space utilization without installing the electric motor in the pressurizing zone 1 in which the possibility of explosion is present due to the leakage of the combustible material.

A driving shaft 21 is connected between the hydraulic motor 20 and the pressurizing means 10, and driving force of the hydraulic motor 20 may be transferred to the pressurizing means 10 through the driving shaft 21.

The combustible material transferring apparatus according to an exemplary embodiment of the present invention shown in FIG. 10 utilizes an operating fluid used to drive the hydraulic motor 20 as lubricating oil supplied to the hydraulic motor 20, unlike an exemplary embodiment shown in FIG. 9. Therefore, the combustible material transferring apparatus shown in FIG. 10 does not need the lubricating oil pump 40 and the lubricating oil pump hydraulic motor 50 shown in FIG. 9.

Meanwhile, the supply of the operating fluid to the hydraulic motor 20 may be simply performed by a hydraulic pressure generating apparatus that is already installed in a marine structure. However, according to the present exemplary embodiment, the hydraulic motor 20 driving the pressurizing means 10 pressurizing the combustible material and a dedicated hydraulic pressure generating apparatus 53 for supplying the lubricating oil to the hydraulic motor 20 are installed, such that the hydraulic motor 20 may receive the operating fluid and the lubricating oil.

The dedicated hydraulic pressure generating apparatus 53 includes a first hydraulic pump 24 supplying the operating fluid to the hydraulic motor 20, a second hydraulic pump 54 supplying the operating fluid as the lubricating oil to the hydraulic motor 20, and a reservoir 52 storing the operating fluid therein.

Two hydraulic pumps having the same specification may be included as the first hydraulic pump 24 in the hydraulic pressure generating apparatus 53 in order to provide against a fault.

The operating fluid stored in the reservoir 52 may be pressurized by the first hydraulic pump 24, be supplied to the hydraulic motor 20 through a first supplying line 25 to operate the hydraulic motor 20, and then return again to the reservoir 52 through a first returning line 26. A portion or all of the operating fluid returning through the first returning line 26 may be supplied directly toward an upper portion of the first hydraulic motor 24 of the first supplying line 25 without passing through the reservoir 52, if necessary.

In addition, the operating fluid stored in the reservoir 52 may be pressurized by the second hydraulic pump 54, be supplied as the lubricating oil to the hydraulic motor 20 through a second supplying line 55, and then return again to the reservoir 52 through a second returning line 56. A portion or all of the operating fluid returning through the second returning line 56 may be supplied directly toward an upper portion of the second hydraulic pump 54 of the second supplying line 55 without passing through the reservoir 52, if necessary.

According to the present exemplary embodiment, a first drain line 27 used when draining all of the operating fluid in the hydraulic motor 20 for maintenance of the hydraulic motor 20 may be installed. The first drain line 27 may be extended from the hydraulic motor 20, particularly, a lower end portion of the hydraulic motor 20 to an outer portion of the reservoir 52 or the hydraulic pressure generating apparatus 53. The first drain line 27 has a valve 28 installed thereon, and the valve 28 is opened only when a drain work is performed, thereby draining the operating fluid in the hydraulic motor 20 toward, for example, the reservoir 52.

In addition, according to the present exemplary embodiment, a lubricating oil drain line 67 used when draining all of the lubricating oil used in the hydraulic motor for maintenance of the hydraulic motor 20 may be installed. The lubricating oil drain line 67 may be extended from the hydraulic motor 20, particularly, a lubricating oil circulating part in the hydraulic motor 20 to an outer portion of the reservoir 52 or the hydraulic pressure generating apparatus 53. The lubricating oil drain line 67 has a valve 68 installed thereon, and the valve 68 is opened only when a drain work is performed, thereby draining the operating fluid as the lubricating oil in the hydraulic motor 20 toward, for example, the reservoir 52.

The hydraulic motor 20 according to the present exemplary embodiment may be a speed variable hydraulic motor of which a speed is variable. In the case of using the speed variable hydraulic motor, there is no need to use a separate deceleration apparatus. Therefore, the speed variable hydraulic motor occupies a smaller installation space and is more advantageous in terms of maintenance as compared with an electric motor requiring a deceleration apparatus such as a deceleration gear, or the like.

According to exemplary embodiments of the present invention, the apparatus for supplying a fuel to an engine of a ship uses the hydraulic motor that does not generate an electric spark as a driving source of the high pressure motor installed in a danger zone, thereby making it possible to miniaturize and lighten all devices, and the apparatus for supplying a fuel to an engine of a ship is installed in an explosion-proof zone without an additional device, thereby making it possible to supply power and lubricating oil to the high pressure pump.

In addition, according to exemplary embodiments of the present invention, an extra hydraulic power unit is provided, thereby making it possible to always drive the high pressure pump without an additional delay even in the case in which a fault occurs in the hydraulic power unit that is in operation.

Further, according to exemplary embodiments of the present invention, hydraulic pressure is supplied to the lubricating motor and the hydraulic motor using one hydraulic power unit, thereby making it possible to decrease the number of separate additional devices.

In addition, the apparatus for regulating a speed of a high pressure pump of a ship uses the hydraulic motor that does not generate an electric spark as a driving source of the high pressure motor installed in a danger zone, thereby making it possible to miniaturize and lighten all devices, and the apparatus for regulating a speed of a high pressure pump of a ship is installed in an explosion-proof zone without an additional device, thereby making it possible to regulate a speed of the high pressure pump.

The spirit of the present invention has been illustratively described hereinabove. It will be appreciated by those skilled in the art that various modifications and alterations may be made without departing from the essential characteristics of the present invention. Accordingly, exemplary embodiments disclosed in the present invention are not to limit the spirit of the present invention, but are to describe the spirit of the present invention. The scope of the present invention is not limited to these exemplary embodiments. The scope of the present invention should be interpreted by the following claims, and it should be interpreted that all the spirits equivalent to the following claims fall within the scope of the present invention.

What is claimed is:

1. An apparatus for supplying fuel to an engine of a ship, comprising:
   a high pressure pump configured to pressurize liquefied natural gas (LNG) and further configured to send the pressurized LNG toward the engine;
   a hydraulic motor configured to drive the high pressure pump;
   a first hydraulic power unit configured to supply hydraulic power to the hydraulic motor;
   a second hydraulic power unit configured to supply hydraulic power to the hydraulic motor, and further configured to operate when the first hydraulic power unit is not operable; and
   a lubricating pump configured to supply lubricating oil the high pressure pump;
   wherein the first hydraulic power unit is connected to the hydraulic motor by a first hydraulic line in which a first shutdown valve is installed,
   the second hydraulic power unit is connected to the hydraulic motor by a second hydraulic line in which a second shutdown valve is installed, and
   the first shutdown valve is open when the first hydraulic power unit operates and the second shutdown valve is open when the second hydraulic power unit operates.

2. The apparatus of claim 1, further comprising a pressure gauge installed in the first hydraulic line and configured to measure a pressure of the first hydraulic line.

3. The apparatus of claim 1, further comprising:
   a lubricating motor configured to drive the lubricating pump.

4. The apparatus of claim 3, further comprising a third hydraulic power unit configured to supply hydraulic power to the lubricating motor and a fourth hydraulic power unit configured to supply hydraulic power to the lubricating motor,
   wherein the fourth hydraulic power unit is configured to operate when the third hydraulic power unit is not operable.

5. The apparatus of claim 4, wherein the third hydraulic power unit is connected to the lubricating motor by a third hydraulic line on which a third shutdown valve is installed,
   the fourth hydraulic power unit is connected to the lubricating motor by a fourth hydraulic line on which a fourth shutdown valve is installed, and
   the third shutdown valve is open when the third hydraulic power unit operates and the fourth shutdown valve is open when the fourth hydraulic power unit operates.

6. The apparatus of claim 3, further comprising a third hydraulic power unit configured to supply hydraulic power to the hydraulic motor and the lubricating motor.

7. The apparatus of claim 6, wherein the third hydraulic power unit is connected to the lubricating motor by a hydraulic line on which a pressure regulating valve is installed, and
the pressure regulating valve is a valve configured to regulate an amount of oil supplied to the lubricating motor.

8. An apparatus for supplying fuel to an engine of a ship, comprising:
a high pressure pump configured to pressurize liquefied natural gas (LNG) and further configured to send the pressurized LNG toward the engine;
a hydraulic motor configured to drive the high pressure;
a first hydraulic power unit configured to supply hydraulic power to the hydraulic motor; and
a second hydraulic power unit configured to supply hydraulic power to the hydraulic motor when the first hydraulic power unit is not operable,
wherein the first hydraulic power unit is connected to the hydraulic motor by a first hydraulic line in which a first shutdown valve is installed,
the second hydraulic power unit is connected to the hydraulic motor by a second hydraulic line in which a second shutdown valve is installed, and
the first shutdown valve is open when the first hydraulic power unit operates and the second shutdown valve is open when the second hydraulic power unit operates.

9. The apparatus of claim 8, further comprising a pressure gauge installed in the first hydraulic line and configured to measure a pressure of the first hydraulic line.

10. The apparatus of claim 8,
wherein at least one of the first and second hydraulic power units comprises a fixed displacement type hydraulic pump and an oil reservoir storing oil,
wherein the fixed displacement type hydraulic pump is configured to transfer oil from the oil reservoir toward the hydraulic motor.

11. The apparatus of claim 10, further comprising a recirculation valve in fluid connection with the fixed displacement type hydraulic pump and the oil reservoir,
wherein the recirculation valve is configured to direct at least a portion of the oil from the fixed displacement type hydraulic pump back to the oil reservoir,
wherein the recirculation valve is installed inside the at least one of the first and second hydraulic power units.

12. The apparatus claim 10, further comprising a recirculation valve in fluid connection with the fixed displacement type hydraulic pump and the oil reservoir,
wherein the recirculation valve is configured to direct at least a portion of the oil from the fixed displacement type hydraulic back to the oil reservoir,
wherein the recirculation valve is installed outside the at least one of the first and second hydraulic power units.

13. A method for regulating a speed of a high pressure pump of a ship, comprising:
transferring oil stored in a reservoir toward a hydraulic line connected to a hydraulic motor using a fixed displacement type hydraulic pump;
regulating a recirculation valve installed on a hydraulic line branched from the hydraulic line to regulate an amount of oil supplied to the hydraulic motor, thereby regulating a speed of the hydraulic motor; and
allowing the speed of the high pressure pump to be regulated depending on regulation of the speed of the hydraulic motor.

14. The method for regulating a speed of a high pressure pump of a ship of claim 13, wherein the fixed displacement type hydraulic pump and the reservoir are included in a hydraulic power unit, and
the recirculation valve is installed inside the hydraulic power unit.

15. The method for regulating a speed of a high pressure pump of a ship of claim 13, wherein the fixed displacement type hydraulic pump and the reservoir are included in a hydraulic power unit, and
the recirculation valve is installed outside the hydraulic power unit.

16. The method for regulating a speed of a high pressure pump of a ship of claim 13, wherein the high pressure pump pressurizes an LNG and supplies the pressurized LNG to an engine.

* * * * *